US011021173B2

(12) United States Patent
Goerick

(10) Patent No.: US 11,021,173 B2
(45) Date of Patent: Jun. 1, 2021

(54) SYSTEM AND METHOD FOR AUTOMATED EXECUTION OF A MANEUVER OR BEHAVIOR OF A SYSTEM

(71) Applicant: HONDA RESEARCH INSTITUTE EUROPE GMBH, Offenbach/Main (DE)

(72) Inventor: Christian Goerick, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 290 days.

(21) Appl. No.: 15/990,921

(22) Filed: May 29, 2018

(65) Prior Publication Data

US 2018/0345994 A1   Dec. 6, 2018

(30) Foreign Application Priority Data

Jun. 1, 2017   (EP) .................................... 17174041

(51) Int. Cl.
| | |
|---|---|
| *B60W 50/10* | (2012.01) |
| *B60W 50/14* | (2020.01) |
| *B60W 50/16* | (2020.01) |
| *B60W 30/18* | (2012.01) |
| *G06F 3/01* | (2006.01) |
| *B60K 35/00* | (2006.01) |
| *B60W 50/00* | (2006.01) |

(52) U.S. Cl.
CPC ............. *B60W 50/16* (2013.01); *B60K 35/00* (2013.01); *B60W 30/18181* (2013.01);
(Continued)

(58) Field of Classification Search
CPC .......... G06F 3/017; G06F 3/016; G06F 3/043; B60K 35/00; B60K 2370/146;
(Continued)

(56) References Cited

U.S. PATENT DOCUMENTS

2003/0187578 A1* 10/2003 Nishira .................. G08G 1/167
    701/301
2006/0009910 A1*  1/2006 Ewerhart .............. B60W 30/16
    701/301

(Continued)

FOREIGN PATENT DOCUMENTS

| DE | 10 2012 101 686 A1 | 9/2013 |
|---|---|---|
| EP | 2 216 197 A1 | 8/2010 |
| EP | 2 669 109 A1 | 12/2013 |

OTHER PUBLICATIONS

European Search Report dated Sep. 20, 2017 corresponding to European Patent Application No. 17174041.8.

(Continued)

*Primary Examiner* — Stephen Holwerda

(74) *Attorney, Agent, or Firm* — Squire Patton Boggs (US) LLP

(57) ABSTRACT

A system for automated execution of a maneuver or behavior determines at first a situation in which the system currently is based on environment sensing. Then, based on the determined situation, maneuver options or behavior options are determined. Such options are maneuvers or behaviors which potentially can be executed by the system in the determined situation. Then information on at least one of the determined maneuver options or behavior options are output using a haptic display. The system receives an input selecting one of the options from a user. On the basis of the selected option then the selected option or maneuver is executed in an automated fashion.

9 Claims, 3 Drawing Sheets

(52) U.S. Cl.
CPC ............ *B60W 50/14* (2013.01); *G06F 3/016* (2013.01); *B60K 2370/141* (2019.05); *B60K 2370/146* (2019.05); *B60K 2370/1464* (2019.05); *B60W 50/10* (2013.01); *B60W 2050/0067* (2013.01); *B60W 2050/146* (2013.01); *B60W 2540/215* (2020.02)

(58) Field of Classification Search
CPC ..... B60K 2370/1464; B60K 2370/141; B60W 50/16; B60W 50/14; B60W 30/18181; B60W 50/10; B60W 2050/0067; B60W 2540/215; B60W 2050/146
See application file for complete search history.

(56) References Cited

U.S. PATENT DOCUMENTS

| | | | |
|---|---|---|---|
| 2008/0023253 A1* | 1/2008 | Prost-Fin | B60N 2/42763 180/400 |
| 2013/0282268 A1* | 10/2013 | Goerick | B60W 30/095 701/301 |
| 2015/0006028 A1 | 1/2015 | Strauss | |
| 2015/0185858 A1* | 7/2015 | Nagara | G06F 3/017 715/863 |
| 2015/0192995 A1* | 7/2015 | Subramanian | G01C 21/3652 340/407.1 |
| 2017/0120930 A1* | 5/2017 | Ling | G06F 3/017 |
| 2018/0335626 A1* | 11/2018 | Ji | B60W 60/0051 |

OTHER PUBLICATIONS

Darrell Etherington: "BMWs HoloActive Touch in-car interface offers tactile feedback on a floating display," TechCrunch, Dec. 15, 2016, XP055403928.

Anonymous: "BMW wins the future with HoloActive Touch controls," Roadshow, Jan. 6, 2017, XP055403934.

* cited by examiner

SYSTEM AND METHOD FOR AUTOMATED EXECUTION OF A MANEUVER OR BEHAVIOR OF A SYSTEM

BACKGROUND

Field

The invention relates to a system, in particular a vehicle, that is capable of executing a maneuver or behavior autonomously when such maneuver or behavior is selected to be executed by an operator of the system.

Description of the Related Art

First, it is to be noted, that the following explanations are given with respect to vehicles as one example for a system. Nevertheless other applications of the present invention are possible as long as the system has the capability to execute a maneuver or behavior which is defined or selected by the operator of the system in an automated fashion. Such system can be any kind of machine. Of course, the present invention, and also the technological background will become apparent from the example using a vehicle.

A mobility device such as a vehicle (car, motorcycle, boat or ship, air plane, . . . ) in many cases is capable of reaching a destination in a plurality of different ways. In former times it was necessary that an operator is capable of controlling (accelerating, braking, steering, . . . ) the vehicle and this is the predominant way to drive a car for example even today. The driver has to operate steering, the accelerator and brake pedal by manual operation. Additional components and operational elements of the vehicle may be used as well like a clutch, a gear shifter, blinker, driving light and so on. Due to automation in any kind of daily life, the drivers expect that also their vehicles will at least in parts be capable of automated execution of specific tasks. A first step toward such increased comfort was introduction of an automatic transmission, making the operation of a clutch and gear shifter unnecessary for the driver. Following this need of the consumers, the industry is currently moving to more automated ways with a final goal of fully automated driving. Of course, at the moment this seems to be a goal that lies pretty far in the future, but first successful the steps have been taken. However, the steps in between full manual and fully automated driving are less clear and conceptionalized.

To illustrate that these steps in between are pretty unclear can be understood from the following model in an easy way. On the lowest lever the pure driving of a vehicle is addressed which means vehicle stabilization and dynamics control. One level above this basic control of the vehicle is the trajectory control, controlling temporarily coherent patterns like lane keeping, left turn or the like. Whereas on the lowest level the driving itself is done, the second level describes how this is done. On the next higher level it is decided what has to be done by determining patterns to be executed. On this level decisions are taken which maneuvers and in which sequence have to be performed and then these maneuvers are monitored and changed eventually, if necessary. These decisions on the other side are taken in light of the overall task to reach, a desired destination. This is the highest level of the driving hierarchy in the herewith introduced model.

Having the different levels of the driving hierarchy in mind it is clear that full automated driving only needs an "operator" of the vehicle to define a destination or a driving mission on the topmost level. Anything below this top level is fully automated. In an extreme realization of this full automated driving it might be even thought of omitting any possibility for the driver to intervene in the execution. Contrary, state of the art driver assistant systems only have the capability to assist the driver by delegating tasks like performing a specific maneuver, lane keeping, lane or vehicle following. The current driver assistant systems may perform such maneuvers or other behaviors on the second lowest level of the above-mentioned model. This means that currently the operator of a system or the driver of a vehicle still needs to decide what needs to be done. But then, there is a need to inform the driver about current options that are available for delegating a task to the vehicle or system. The driver needs to know what can be done before the driver can define the task to be delegated for automated execution. Of course, it could be thought of the driver having all the options in mind. But as the driver is confronted with such a large amount of information and not all options can reasonably be executed in an arbitrary traffic situation, it would be desirable if only the options that are currently available in a specific traffic situation can be selected by the driver. This reduces the chance that the driver makes a wrong decision.

One approach to present the driver the options for different maneuvers that may be executed in a determined traffic situation is described in EP 2 669 109 A1. The options that are available for the driver are determined based on a traffic situation and furthermore presented to the driver so that the driver is informed about the maneuver itself and the correct direction of the potential maneuver. The options are displayed on a pair of display units namely one display on an instrument panel and the other one being a head up display in order to reduce distraction of the driver. The driver may then choose one of the presented potential maneuvers (options) in a current traffic situations.

One major drawback of such system and method is that the options are presented visually. Thus, the gaze of the operator is diverted from the environment for a long time and further the visual channel of humans driving vehicles is already highly loaded by many different indicators, light signals and the driving scene itself. Thus, it is questionable if the presentation of a plurality of options from which the driver has to select by using the visual channel is in fact helpful in the end. Of course, the solution as described could mitigate the latter aspect itself, because some of the signals from the driver assistant system might not be necessary anymore. The load to analyze the driving scene will remain nevertheless.

SUMMARY

Thus, it is an object of the present invention to improve a system and method for semi-automated execution of a maneuver or behavior.

This object is achieved by the system and method according to the independent claims. The dependent claims define advantageous further aspects of the present invention.

According to the present invention the system which may particularly be a vehicle is capable of an automated execution of a maneuver or behavior that is selected by an operator of the system.

According to the present invention, the system, which may particularly be a vehicle, is capable of an automated execution of a maneuver or behavior that is selected by an operator (driver) of the system. Such selection can be performed either by choosing one of a plurality of options or by selecting/dismissing the only available option. The system comprises a situation analyzing unit for determining a situation. For the example of a traffic situation such systems are well-known in the art. They observe the environment of the vehicle by means of sensors and determine a current traffic situation the vehicle is in. Then, according to the invention, a maneuver and/or behavior determining unit determines the available options for executing a maneuver and/or a behavior that might be executed in the determined situation. This determination ensures that only such maneuver options and/or behavior options are determined that practically can be realized by the entire system and are reasonable in the determined situation. Other options might be available in other traffic situations. The system further comprises a haptic display unit for outputting information on at least one of the determined maneuver and/or behavior options. Such haptic display, which is used for outputting information on the available options according to the present invention has the big advantage that it does not need the visual channel for conveying information on the options from the system to its operator or driver. Contrary, senses of the driver are used, which are usually not exploited at all. Such haptic display units, for example, use an array of ultrasonic elements in order to give a person an impression of a virtual object. Thus, by using such haptic display unit, it is possible to convey information to the driver without a necessity for the driver to move his eye direction from an observation point in the environment of the vehicle to a display inside the vehicle. Even if it is thought of a head up display, at least some distraction of the driver's attention can be observed. If the driver, based on the information received via the haptic display unit, selects one of the presented maneuver and/or behavior options, he makes an input for selecting one of these options. The system comprises a selection input unit for accepting a selection of one of the maneuvers and based thereon, actuators of the system are used in order to execute the selected option.

It is in particular preferred that the haptic display is configured such that it is capable of stimulating the operator without any physical contact between the operator and the haptic display. As mentioned above, one example for realizing such contactless stimulation of the driver can be made by using the array of ultrasonic emitters.

Furthermore, it is advantageous if the information, which is output by means of the haptic display, encodes at least one maneuver and/or behavior spatially and/or temporarily and/ or with respect to intensity of the haptic stimulation. Using space, time and intensity for encoding the entire information gives the opportunity to convey information on a plurality of options in parallel. This is in particular an advantage over prior art approaches, which use audio signals or artificial voices for providing information.

According to another advantageous aspect, the selection input unit is configured to determine a selection made by the operator based by a gesture made by the driver. Using such gesture in order to select one of the presented options has the advantage that a selection can be realized very intuitively without for example pushing a dedicated button or operating any other hardware control.

BRIEF DESCRIPTION OF THE DRAWINGS

Details of the inventive system and method will now be explained with reference to the annexed drawings in which.

DETAILED DESCRIPTION

Figure 1:
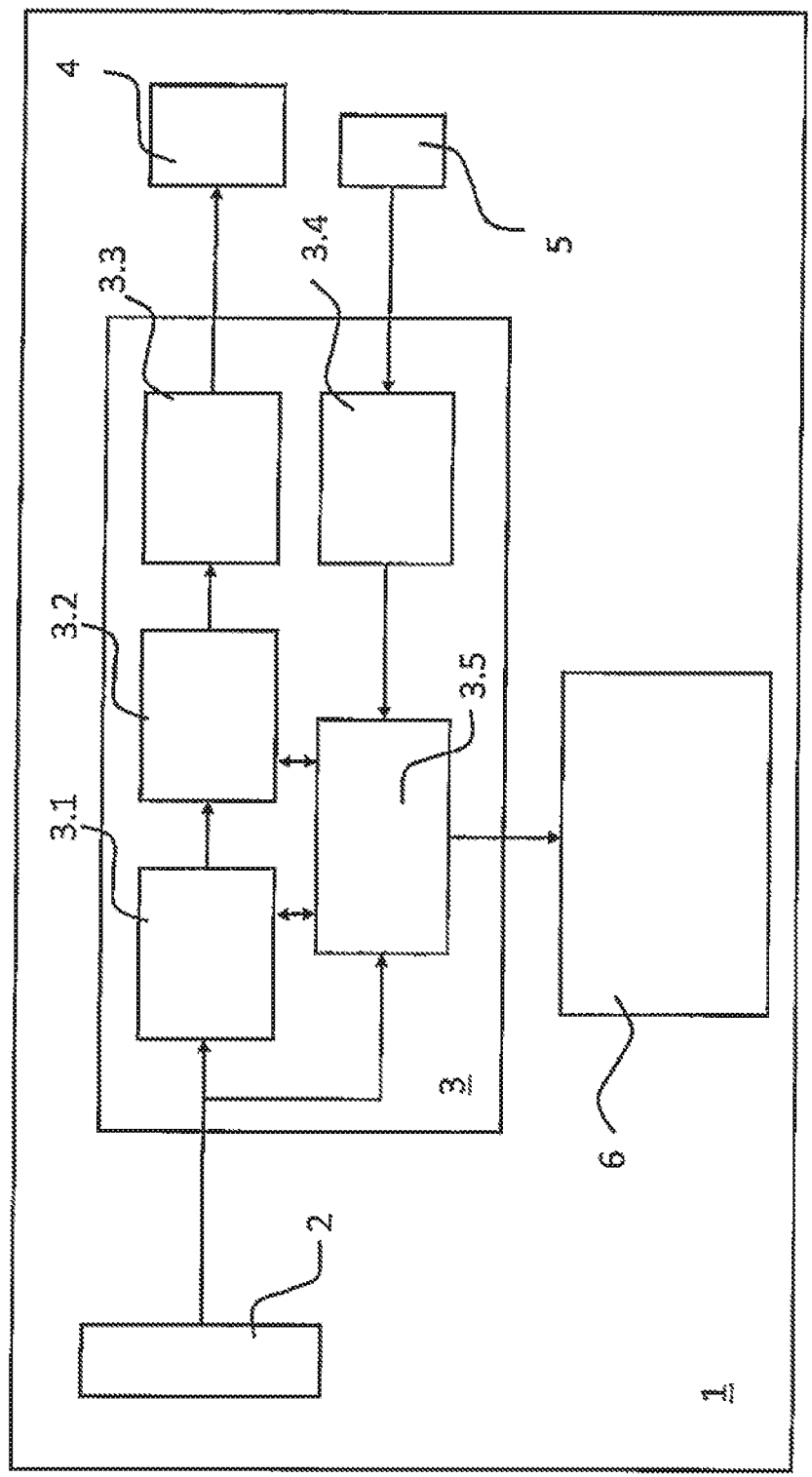
FIG. 1 shows a block diagram of the inventive system taking as an example a vehicle.

In FIG. 1, the invention will be described in detail with respect to a vehicle 1 representative of any kind of system that is capable to autonomously or semi-automated execution of any delegated task. Such tasks may be a driving maneuver or any kind or behavior. Such maneuver is can be a lane change or a turning movement to the left or right, and an example for a behavior might be following a preceding vehicle or keeping the lane.

The vehicle 1 comprises one or a plurality of sensors 2 that are dedicated to physically sense the environment of the vehicle 1. Based on the sensor signals, which may be for example camera signals, radar signals, lidar signals or any other signals generated by sensors that are capable of perceiving the environment of the vehicle, are supplied to a processor 3. The processor 3 comprises a situation modeling unit 3.1, which is realized as a software module that is executed by processor 3. The situation modeling unit 3.1 is supplied with the sensor signals and analyzes this description of a scene in order to determine a traffic situation. The situation modeling unit 3.1 furthermore makes a prediction of the traffic situation on the basis of the current traffic situation in order to provide a basis for determining the maneuver options and/or behavior options that are applicable in the present situation. Information of the current situation and situation development is then supplied to an option determining unit 3.2. The option determining unit 3.2, as mentioned above, filters from all available options (maneuvers and behaviors that in principle can be performed by the vehicle) that might be carried out by the vehicle 1, those maneuvers and behaviors that reasonably can be executed in the determined and predicted traffic situation. Based on the output from the option determining unit 3.2, information to be output is encoded by an information encoding unit 3.3. In the information encoding unit 3.3, all the options that are determined in the option determining unit 3.2 are encoded in a signal that is suitable for controlling a haptic display 4. By encoding the options that are determined in the option determining unit 3.2, it is possible to convey information about the plurality of available options to the driver of the vehicle 1. The reason is that by using the haptic display 4 it is possible to simultaneously stimulate the driver at for example a plurality of different locations of his hand or the like. Thus, the driver will be well able to distinguish between the different pieces of information each corresponding to one option. The options that are determined in the option determining unit 3.2 are encoded by using at least one of space, time and intensity characteristics of the final stimulation of the driver.

Based on the presented information the driver of the vehicle 1 will make a gesture in order to select one of the presented options. The gesture will be sensed by a gesture sensor 5. The signal from the gesture sensor 5 is provided to a gesture recognition unit 3.4. The gesture recognition unit 3.4 identifies the gesture that was made by the driver and associates it with one of the options. The information of the thus selected option is then fed to a control signal generation unit 3.5. In the control signal generation unit 3.5 the drive signals in order to drive actuators 6 of the vehicle 1 are generated. By using one or a plurality of actuators 6, like for example throttle motor, brake system and the like, the selected maneuver or behavior is executed by the vehicle 1.

The control signal generation unit 3.5 further receives signals from the sensors 2 in order to perform the maneuver or behavior execution. Carrying out and executing such a maneuver or behavior per se is known from the prior art. The control signal generation unit 3.5 further is in communication with the situation modelling unit 3.1 and the option determining unit 3.2. In particular communication with the option determining unit 3.2 enables the option determining unit 3.2 not to present information about the currently executed maneuver or behavior redundantly to the driver.

Figure 2:
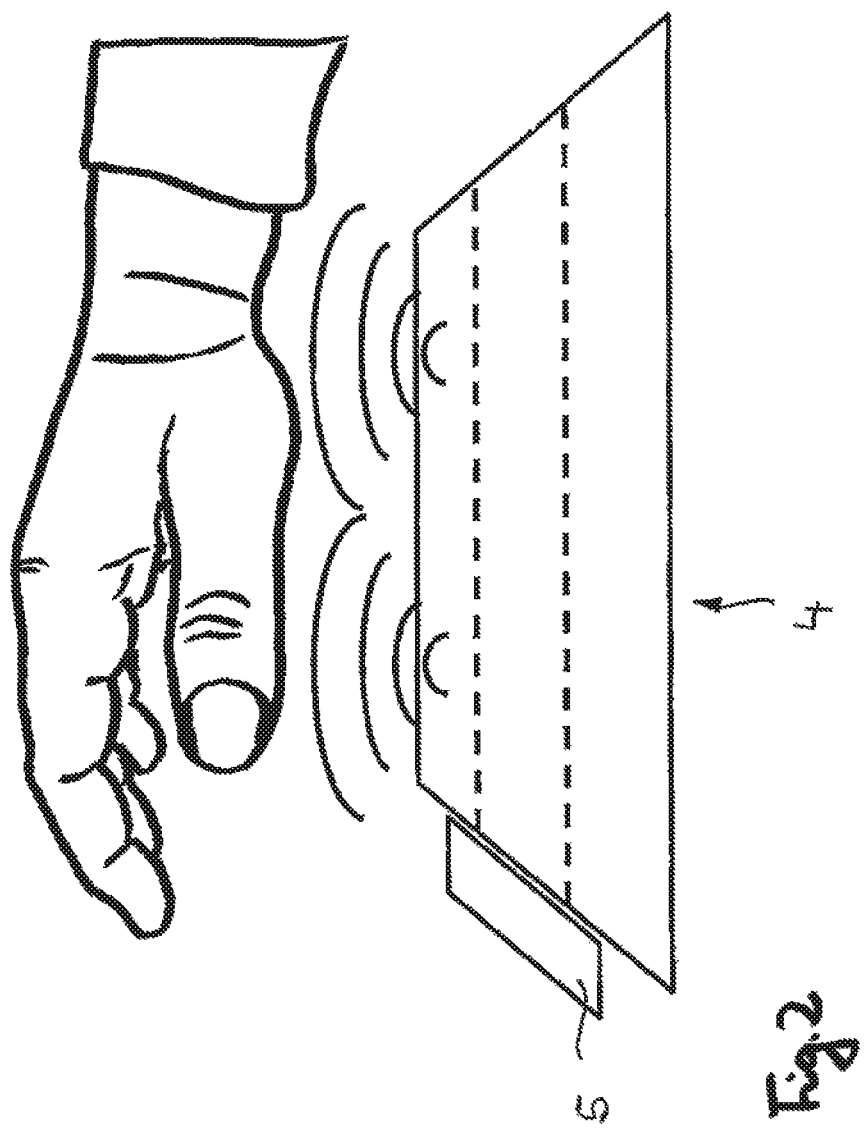
FIG. 2 illustrates the operation of a haptic display to convey information to an operator.

Using the illustration of FIG. 2 a very simple way of presenting information on available options to a driver according to the present invention shall be explained. FIG. 2 shows a haptic display 4 which is divided into three areas. The arrangement of the haptic display 4 is such that the driver being in a comfortable driving position is able to hold his hand with a distance from the haptic display unit 4. If in the option determining unit 3.2 it is determined that currently taking a right turn is a poor option within the current situation, then for example the option determining unit 3.2 determines that only going straight or turning left is left as reasonable options for a future driving maneuver. Consequently it could be indicated to the driver that he has two options, namely going straight or turning left. In the present case the opposite indication is used in order to inform the driver about the situations. Obviously in general there are three possibilities, namely going straight, turning left or turning right. If as indicated above the option "go right" is not reasonable, then for example the driver can be warned by activating the rightmost area of the haptic display 4 (the one in the background in FIG. 2) in order to stimulate the rightmost area of the palm of the driver's hand for example. Such stimulation resembles a virtual obstacle for this option. Similar procedures are applied for driving left or straight or any other driving decision that could be taken. It is evident that the available options may vary and change during driving because of a change in the driving context.

As illustrated in FIG. 2 it is in particular preferred that the driver holds his hand above the haptic display 4. Then the display 4 can stimulate haptic sensations at the palm and the lower side of the hand without the driver touching the display directly.

Figure 3:
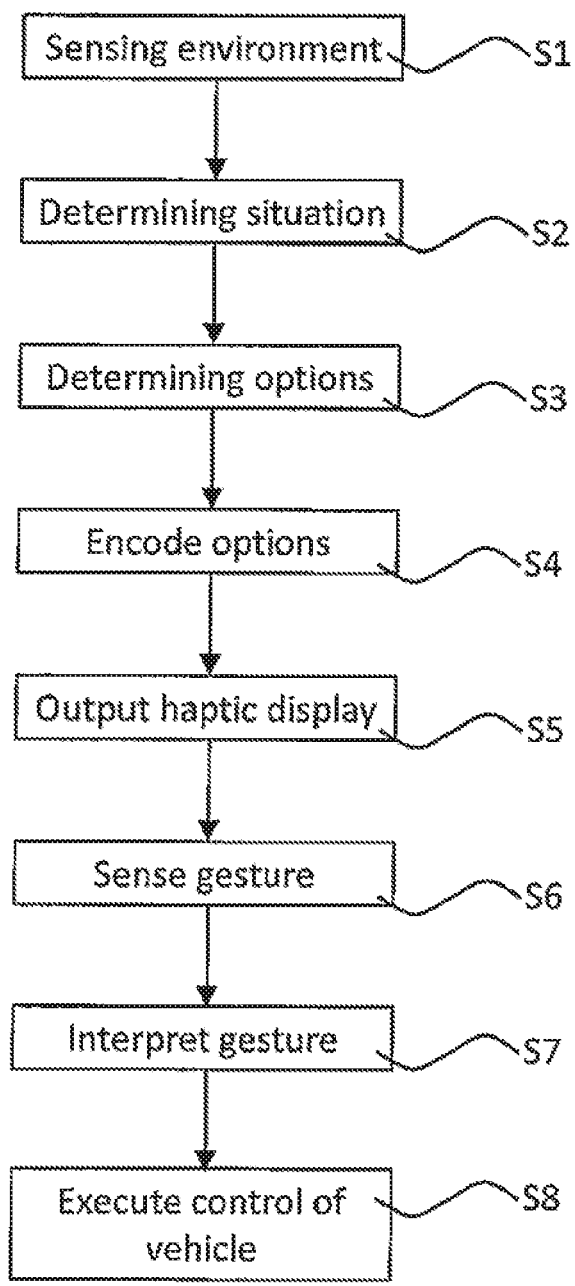
FIG. 3 shows a flowchart illustrating the main steps of the present invention.

FIG. 3 is a flowchart illustrating the main steps of the present invention. At first the environment is sensed in step 1. On the basis of the environment perception a traffic situation is determined in step 2. Then by filtering from among all available options that might be executed by the vehicle, those options of maneuvers and behaviors are determined in step S3 that are applicable in the determined traffic situation. These options are encoded in an information (S4) that is finally presented to the driver of the vehicle. The encoded information is output by a haptic display in step 5 such that the driver (or more general the operator of any system) is capable of perceiving the plurality of different options without touching the display and without changing his eye direction.

The driver then selects one of the presented options (or one of the options that was not indicated as being not available) and makes a respective gesture for selecting this option. The gesture is sensed by a gesture sensor 5 in step S6 and is interpreted by the gesture recognition unit 3.5 in step S7. Finally control of the vehicle 1 is executed based on the selected option in step 8.

The invention claimed is:

1. A system for automated execution of a maneuver or behavior selected by an operator of the system, the system comprising:

a situation analyzing unit for determining a currently experienced situation;

a maneuver or behavior determining unit for determining maneuver options or behavior options that potentially can be realized by the system in the determined situation;

a haptic display unit for outputting information on at least one of the determined maneuver options or behavior options;

a selection input unit for accepting a system operator's selection of one of the output maneuver options or behavior options;

actuators configured to execute the selected maneuver option or behavior option;

wherein the haptic display unit is configured to generate a stimulation of the operator without physical contact between the operator and the haptic display unit; and wherein the generated stimulation encodes the at least one maneuver option or behavior option by using spatial characteristics of a haptic stimulation of the operator, wherein the haptic display unit is divided into multiple areas, and each area is configured to stimulate a location of the operator so as to simultaneously stimulate the operator at a plurality of different locations of the operator, each location corresponding to one selectable output maneuver option or behavior option.

2. The system according to claim 1, wherein
the haptic display unit is configured to output information on a plurality of maneuver options or display options simultaneously.

3. The system according to claim 1, wherein
the selection input unit is configured to determine the selection made by the operator based on a gesture made by the operator.

4. The system according to claim 1, wherein
the system is a vehicle.

5. A method for automated execution of a maneuver or behavior selected by an operator, the method comprising the steps of:

determining a situation in which a system executing the method currently is based on environment sensing;

determining maneuver options or behavior options based on the determined situation, wherein each such option is a maneuver or behavior which potentially can be executed by the system in the determined situation;

outputting information on at least one of the determined maneuver options or behavior options via a haptic display unit;

receiving an input for selecting one of the output maneuver options or behavior options;

executing the selected maneuver option or behavior option by correspondingly driving actuators of the system; and wherein the method includes outputting, to the operator of the system via the haptic display unit, information by a stimulation of the operator without physical contact between the operator and the haptic display unit; and wherein the stimulation encodes the at least one maneuver option or behavior option by using spatial characteristics of a haptic stimulation of the operator, wherein the haptic display unit is divided into multiple areas, and each area is configured to stimulate a location of the operator so as to simultaneously stimulate the operator at a plurality of different locations of the operator, each location corresponding to one selectable output maneuver option or behavior option.

6. The method according to claim 5, wherein
a plurality of maneuver options or behavior options is output simultaneously.

7. The method according to claim 6, wherein
the selection of one maneuver option or behavior option is performed based on gesture recognition of a gesture made by the operator.

8. A system for automated execution of a maneuver or behavior selected by an operator of the system, the system comprising:
a situation analyzing unit for determining a currently experienced situation;
a maneuver or behavior determining unit for determining maneuver options or behavior options that potentially can be realized by the system in the determined situation;
a haptic display unit for outputting information on at least one of the determined maneuver options or behavior options;
a selection input unit for accepting a system operator's selection of one of the output maneuver options or behavior options;
actuators configured to execute the selected maneuver option or behavior option;
wherein the haptic display unit is configured to generate a stimulation of the operator without physical contact between the operator and the haptic display unit; and
wherein the stimulation encodes the at least one maneuver option or behavior option by using at least one of time characteristics of a haptic stimulation of the operator and intensity characteristics of the haptic stimulation of the operator,
wherein the haptic display unit is divided into multiple areas, and each area is configured to stimulate a location of the operator so as to simultaneously stimulate the operator at a plurality of different locations of the operator, each location corresponding to one selectable output maneuver option or behavior option.

9. A method for automated execution of a maneuver or behavior selected by an operator, the method comprising the steps of:
determining a situation in which a system executing the method currently is based on environment sensing;
determining maneuver options or behavior options based on the determined situation, wherein each such option is a maneuver or behavior which potentially can be executed by the system in the determined situation;
outputting information on at least one of the determined maneuver options or behavior options via a haptic display unit;
receiving an input for selecting one of the output maneuver options or behavior options;
executing the selected maneuver option or behavior option by correspondingly driving actuators of the system; and
wherein the method includes outputting, to the operator of the system via the haptic display unit, information by a stimulation of the operator without physical contact between the operator and the haptic display unit; and
wherein the stimulation encodes the at least one maneuver option or behavior option by using at least one of time characteristics of a haptic stimulation of the operator and intensity characteristics of the haptic stimulation of the operator,
wherein the haptic display unit is divided into multiple areas, and each area is configured to stimulate a location of the operator so as to simultaneously stimulate the operator at a plurality of different locations of the operator, each location corresponding to one output maneuver option or behavior option.

* * * * *